Aug. 1, 1939.   H. J. SMITH   2,167,817
SOUND RECORDER AND REPRODUCER
Filed Dec. 9, 1936   6 Sheets-Sheet 5
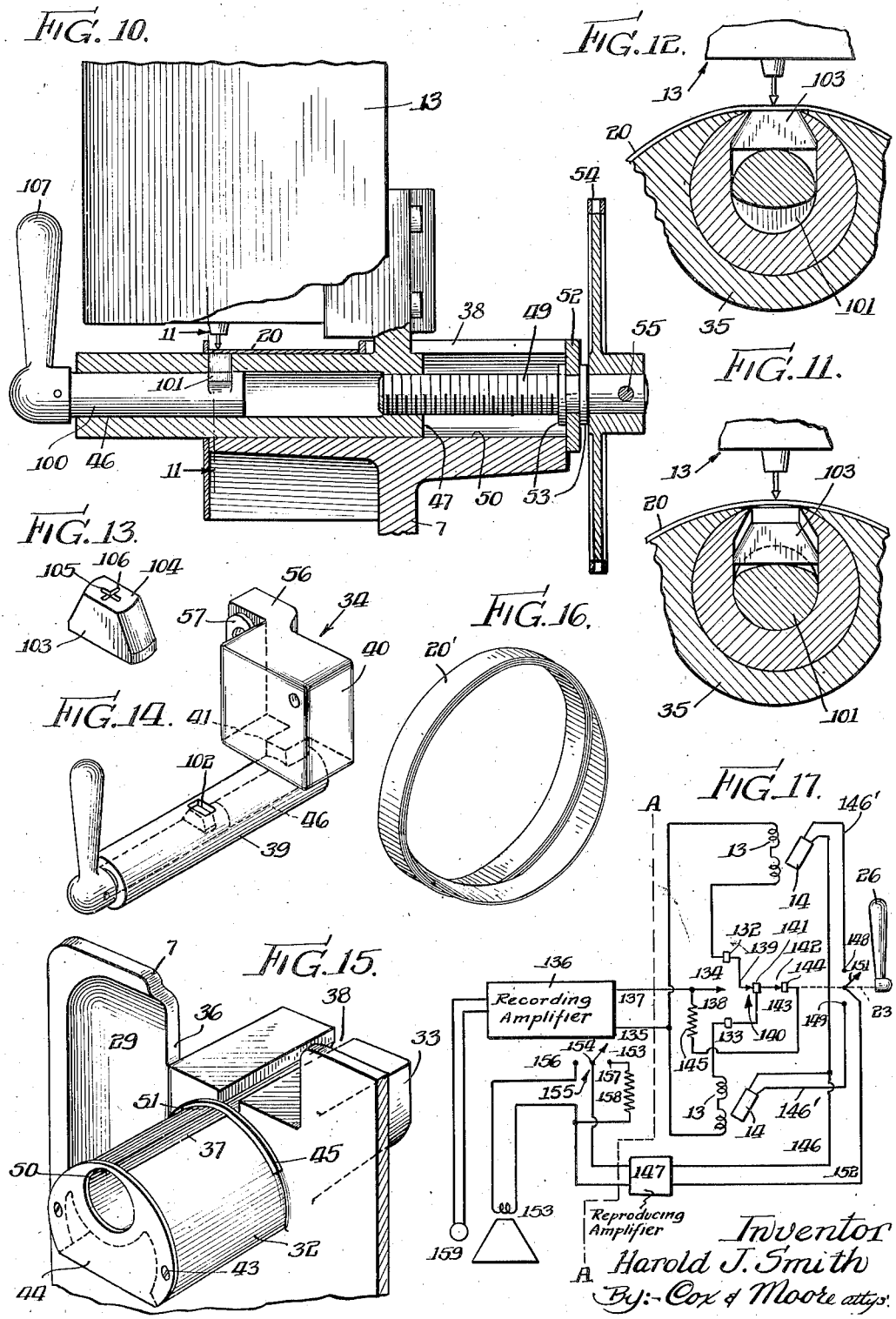

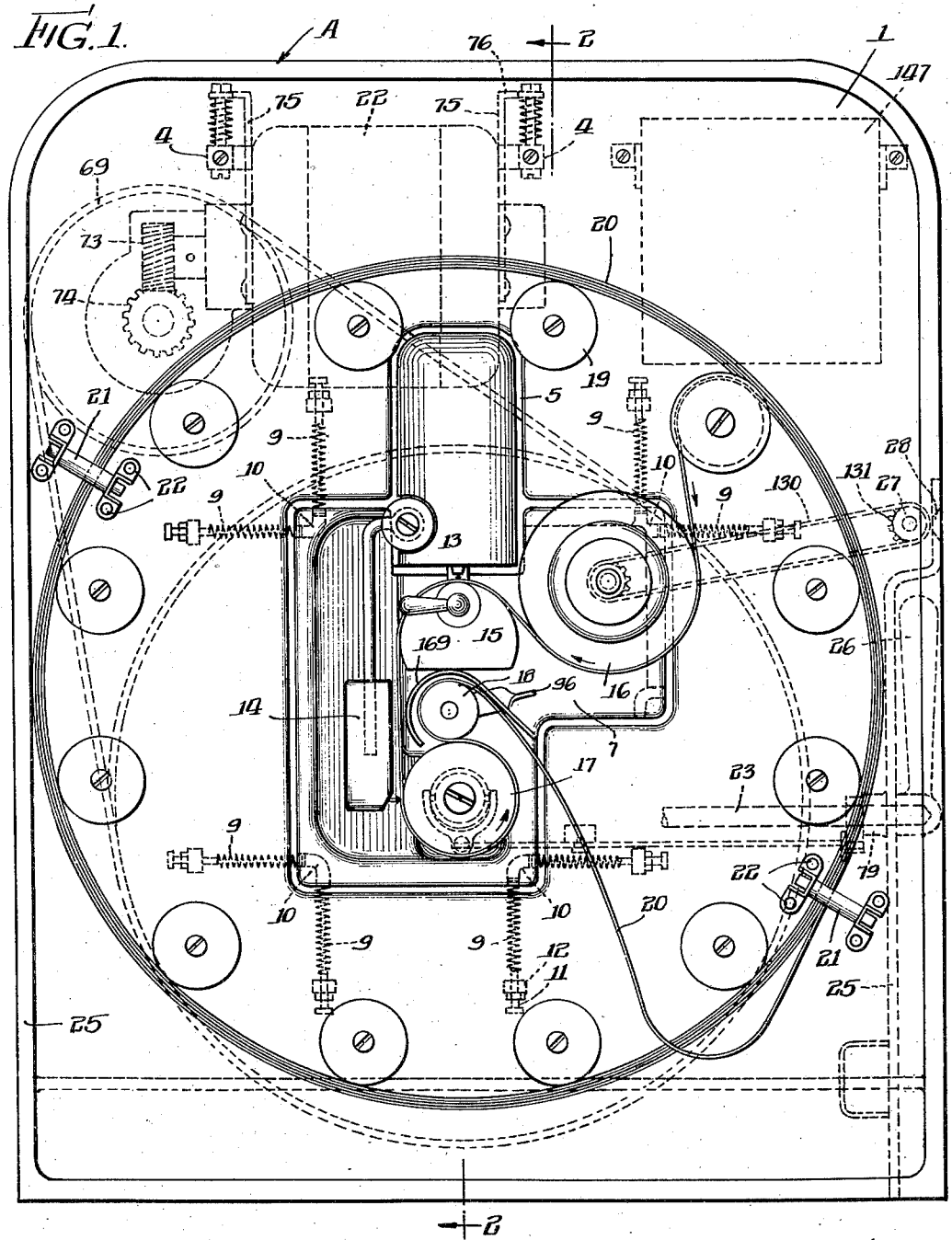

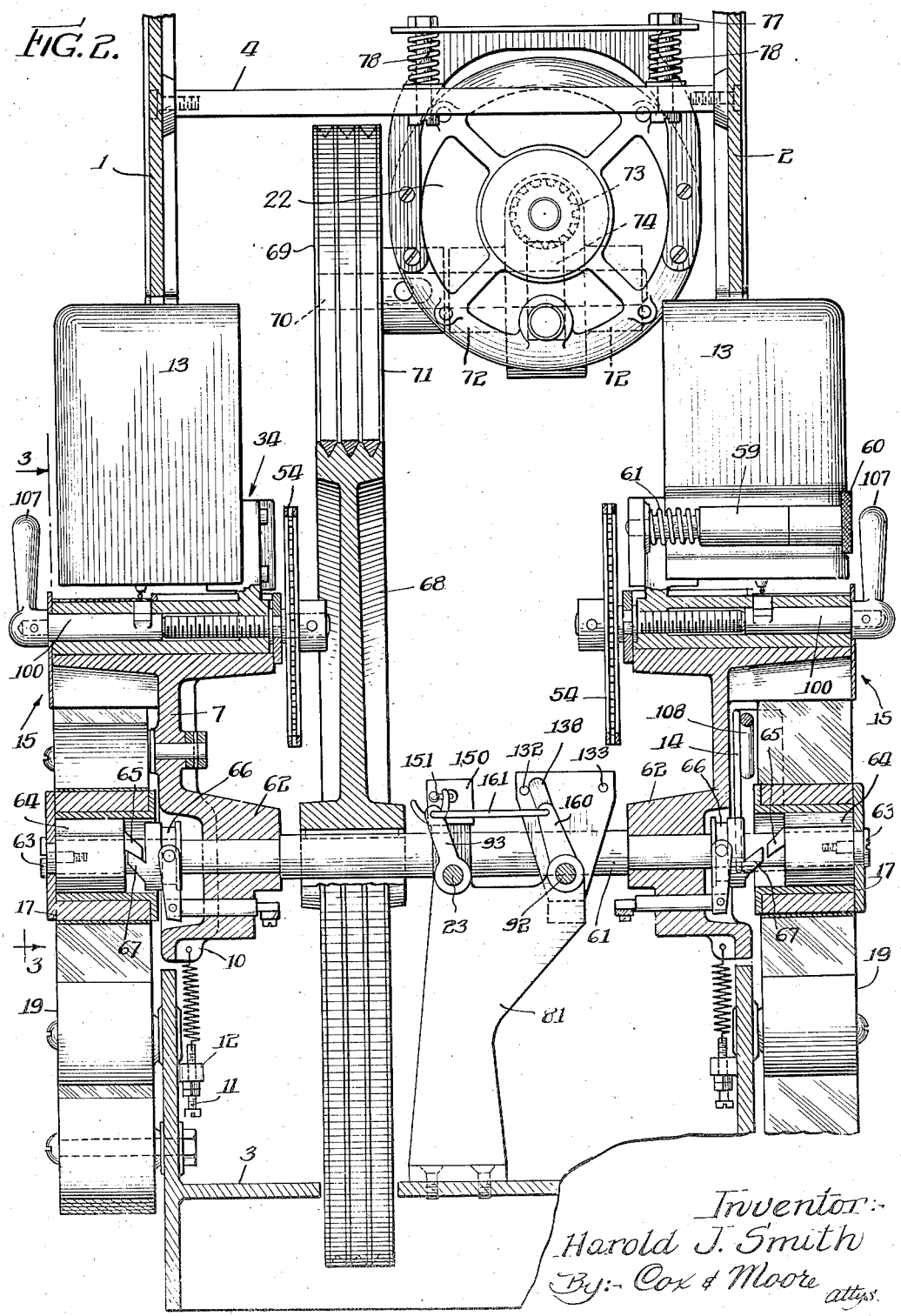

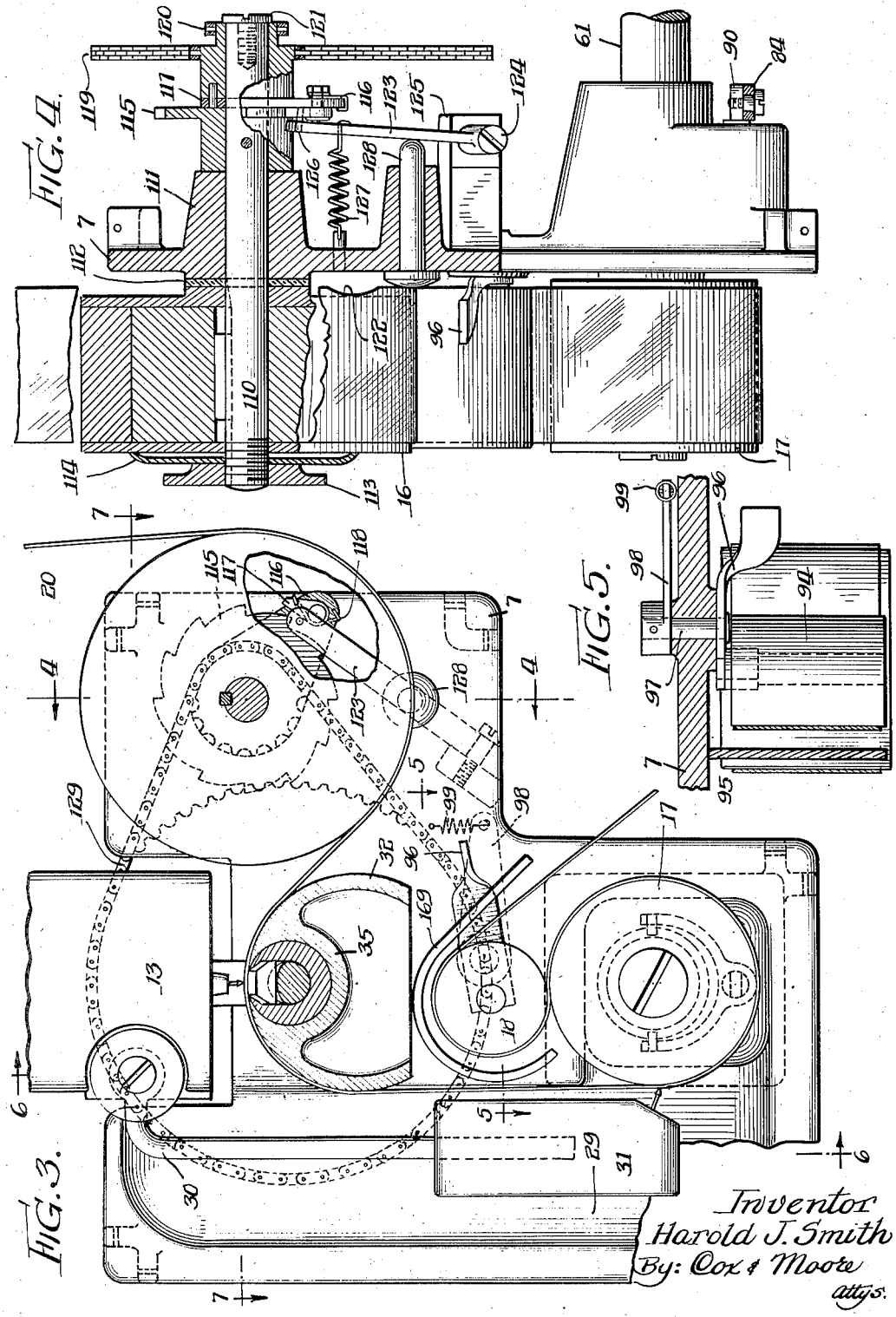

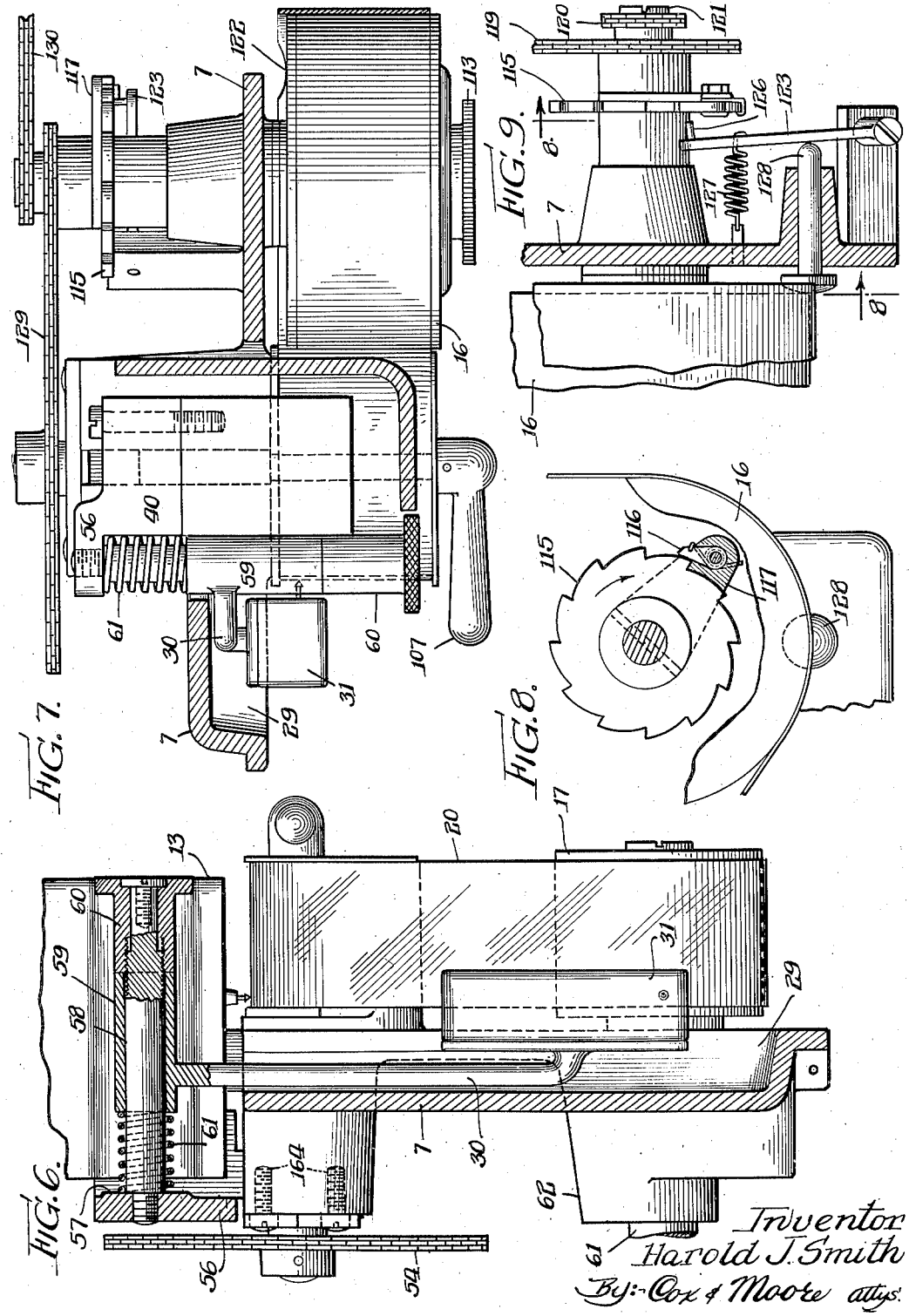

Aug. 1, 1939.  H. J. SMITH  2,167,817
SOUND RECORDER AND REPRODUCER
Filed Dec. 9, 1936  6 Sheets-Sheet 6

Inventor
Harold J. Smith
By:- Cox & Moore attys

Patented Aug. 1, 1939

2,167,817

UNITED STATES PATENT OFFICE 2,167,817

SOUND RECORDER AND REPRODUCER

Harold J. Smith, Riverside, Ill., assignor to Technical Research Corporation, Chicago, Ill., a corporation of Delaware Application December 9, 1936, Serial No. 115,007

14 Claims. (Cl. 274—11)

This invention relates in general to a multiple sound recorder, and in particular to a combined multi-sound recorder and reproducer for use in reporting court proceedings.

It is an object of applicant's invention to provide a simplified and inexpensive construction for a continuously recording sound recorder, more particularly adapted for reporting court proceedings.

It is a further object of applicant's invention to provide a combined sound recorder and sound reproducer wherein by simple manipulation of a control mechanism the sound reproducer may be rendered effective to reproduce any selected portion or portions of the sound previously recorded.

It is a further object of applicant's invention to provide a combined sound recorder and sound reproducer having means for instantaneously rendering the reproducer effective to repeat any selected portion of the previously recorded sound.

In the continuous reel reproducers of the prior art with which applicant is familiar, it has been customary to position the reproducer upon a base whose plane is angularly inclined with respect to the plane of the reel in order to reproduce from the loop portion of the film. The loop portion of the film is that portion which joins the inside and outside turns of the continuous reel. This positioning of the reproducer has been unsatisfactory for a number of reasons, chief among which are the following. Complicated apparatus has been required to direct the loop portion of the film from the reel to the reproducer and to provide the necessary tension for said portion of the film. In such an arrangement, the loop portion of the film is necessarily drawn from the reel at an angle with respect to the plane of said reel. The consequent twisting of the film creates torsional strains which prevent the accurate reproduction of the sound on the film, and, if the degree of tension upon the film is not constantly maintained within very narrow limits, the film becomes "kinked" and eventually cracks at the point of twist. It is accordingly an object of applicant's invention to eliminate these defects in the film feeding means of the prior art devices and to provide a film feeding means for continuous reel reproducers and/or recorders which shall be simple in structure and light in weight.

It is another object of this invention to provide a multi-track sound-on-film recorder wherein misalinement of the "cutter" of the recorder and the groove in the film-supporting base—in which groove the cutter operates—shall be absolutely prevented.

It is another object of the invention to provide in a multi-track, sound-on-film recorder and/or reproducer, automatic means for relatively shifting the film and recorder or reproducer from track to track of the film, which means shall be reliable and noiseless in operation and simple in construction.

A further object of applicant's invention is to provide means for indicating the track upon which a recording is being made.

It is a further object of the invention to provide in a film feeding and driving device for sound recorders and reproducers, means for longitudinally tensioning the film, which means shall supply a constant retarding force and shall be noiseless and reliable in operation.

It is an object of applicant's invention to provide a portable sound recorder and/or reproducer.

It is another object of the invention to provide in a multi-unit sound recorder and/or reproducer, means for selectively operating and controlling the units separately or simultaneously, as desired.

A further object of the invention is to provide a mounting for a sound recorder and/or reproducer of such construction that the recorder or reproducer will not be subjected to the vibrations of the driving means.

Another object of the invention is to provide a unit mounting for the recorder or reproducer means and for the film driving and tensioning means of such construction that said means can be readily replaced by a unit of similar construction.

Other and further objects and advantages of the invention will be apparent from the following description.

The accompanying drawings illustrate a selected embodiment of this invention and the views therein are as follows.

Fig. 1 is a side elevation of a machine embodying applicant's invention.

Fig. 2 is a vertical section taken along the line 2—2 of Fig. 1.

Fig. 3 is a vertical elevation partly in section taken along the line 3—3 of Fig. 2.

Fig. 4 is a vertical section taken along the line 4—4 of Fig. 3.

Fig. 5 is a horizontal section taken along the line 5—5 of Fig. 3.

Fig. 6 is a vertical section taken along the line 6—6 of Fig. 3.

Fig. 7 is a horizontal section taken along the line 7—7 of Fig. 3.

Fig. 8 is a vertical elevation partly in section taken along the line 8—8 of Fig. 9.

Fig. 9 is a vertical detail elevation showing the change-over mechanism in operated condition.

Fig. 10 is a partial vertical section through the recorder head and base showing the parts in one extreme adjusted position.

Fig. 11 is a detail vertical section taken along the line 11—11 of Fig. 10.

Fig. 12 is a detail vertical section similar to Fig. 11 but showing the parts in a different adjusted position.

Fig. 13 is a perspective view of one of the parts shown in Figs. 11 and 12.

Fig. 14 is a perspective view of the adjustable casting upon which the recorder head is adapted to be mounted.

Fig. 15 is a perspective view of the casting on which the adjustable casting in Fig. 14 is adapted to be mounted.

Fig. 16 is a perspective view of a continuous reel with which applicant's device is intended to operate.

Fig. 17 is a schematic circuit showing the electrical association of the elements of applicant's sound recorder and reproducer.

Figure 18:
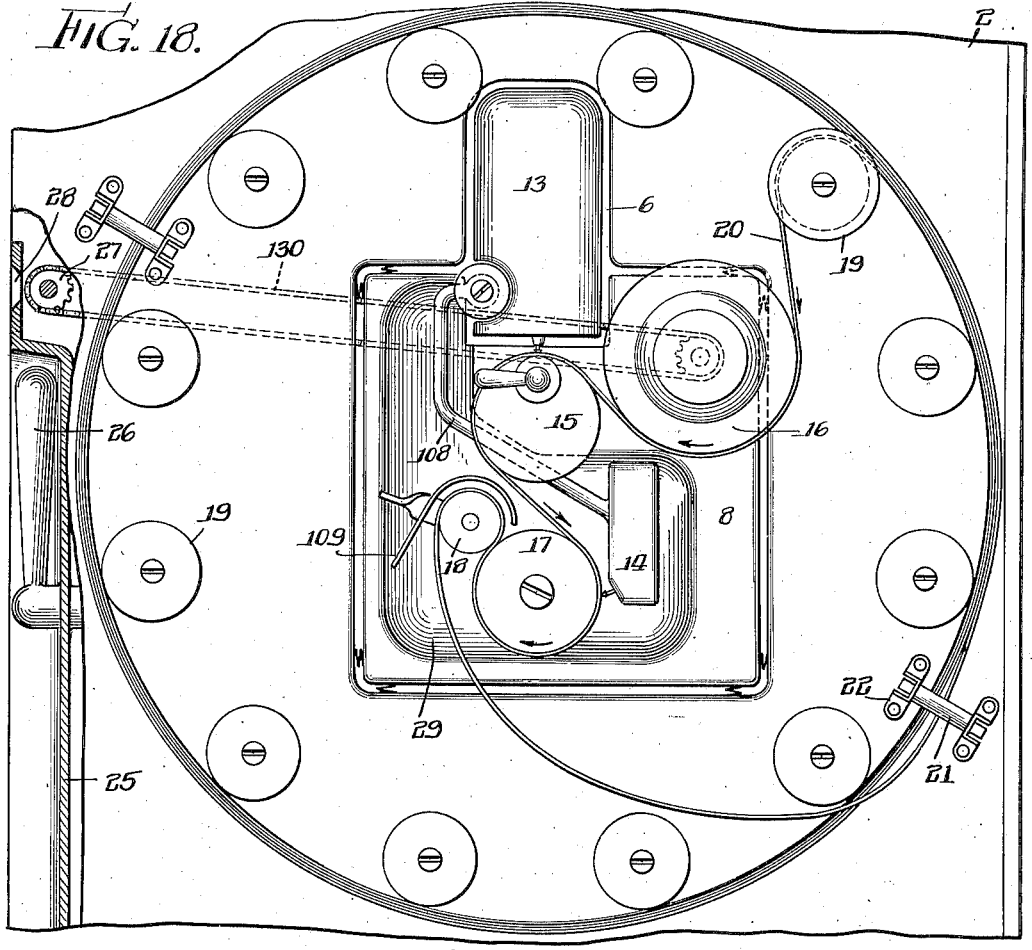
Fig. 18 is a vertical elevation of the opposite side of the machine from that illustrated in Fig. 1.

As shown in the drawings, a support or housing A for a recorder and reproducer comprises vertical side walls 1 and 2; front and rear walls 25; a horizontal bottom plate 3; and side wall supporting bars 4. Mounted within openings 5 and 6 in the side walls 1 and 2, as best shown in Figs. 1 and 18, are plates 7 and 8. These plates 7 and 8 are resiliently mounted by springs 9 upon the side walls 1 and 2. The springs 9 are each fastened at one end to a rearwardly extending lug 10 formed integrally with, or secured to, the plate 7 or 8, and the opposite end of each spring is adjustably secured by a screw 11 to a threaded lug 12 formed integrally with, or secured to, the side walls 1 and 2, as best shown in Figs. 1 and 2.

Upon each of the plates 7 and 8 are formed or mounted, in a manner to be later described, a recorder 13, a reproducer 14, a film directing and recording anvil 15, a tension and change-over control roller 16, a drive roller 17 and a pressure roller 18.

As best shown in Figs. 1 and 18, a plurality of reel supporting and film guiding idler rollers 19 is secured to the side walls 1 and 2. These idler rollers 19 are equi-distantly spaced around the circumference of an imaginary circle of such diameter that the rollers 19 provide a reel supporting frame of the desired size.

A continuous reel or record blank 20' of film 20 may comprise any suitable film stock, but is preferably of a cellulose acetate stock, such as forms the base for the ordinary emulsion treated photographic film. The reel 20' is formed by winding one or more turns of the desired diameter and by connecting the inner and outer turns in any suitable, conventional manner to form a continuous reel having a loop portion connecting said inner and outer turns. This continuous reel is mounted upon the rollers 19, and the loop portion connecting the inner and outer turns of the reel passes around the tension roller 16 from the roller 19 immediately above and adjacent to said tension roller. From the tension roller 16 the film is directed upwardly and over the recording anvil 15, and from the anvil the film passes downwardly around the drive roller 17 and between that roller and the pressure roller 18. From the pressure roller 18 the film returns to the outer turn of the reel. The portion of the film between the pressure roller 18 and the outer turn of the reel is of sufficient length to permit it to hang loosely and without tension. For retaining the reel in position upon the rollers 19, diametrically disposed pins 21 are provided. These pins 21 are carried in brackets 22, to which they are connected in any usual and convenient manner permitting their ready removal for the insertion of the reel 20 between said brackets.

From the description thus far set forth it would be apparent that applicant has provided a compact and simple structure for a continuous reel, multi-unit sound recorder and reproducer wherein the recorder and reproducer are mounted within the reel and wherein the film is drawn from the reel along a path which lies wholly within the plane of the reel.

A motor 22, Figs. 1 and 2, which is connected to the driving roller 17 in a manner later to be described, is mounted within the housing and supported upon a pair of the side wall supporting bars 4. The operating shaft 23 of a selective clutch and switch control mechanism, indicated generally by the numeral 24 in Fig. 19, extends through the front face plate 25 of the housing, and carries at its outer end, within a recessed portion of the plate 25, an operating handle 26. An indicator 27, mounted in any suitable way on the inner side of the face plate 25 behind an opening 28 therein, serves to indicate the number of the sound track upon which a recording is then being made. This indicator is operated by means of the tension roller 16 as will later appear.

The sound recorder and reproducer are mounted for step-by-step movement transversely of the film and its supporting anvil, as best shown in Figs. 2 to 10, 14 and 15. As best shown in Fig. 15, the resiliently mounted plate 7, which forms the support for the sound recorder and reproducer, comprises a vertical wall portion having a recessed or dished out portion 29 for receiving the mounting arm 30 and the sound head 31 of the sound reproducer 14, as best shown in Fig. 6. The film supporting anvil or base 15 is formed integrally with the plate 7 and comprises a body portion 32 projecting horizontally from the front face of said plate. A body portion or support 33 projects horizontally from the opposite face of said plate in substantial alinement with said body portion 32 for receiving and supporting the casting 34, Fig. 14, upon which are adapted to be mounted the recorder 13 and reproducer 14. The body portion 32 of the anvil 15 is substantially semi-cylindrical in shape and has a portion 35 forming a boss. The body portion 33 is substantially rectangular in shape and extends laterally from a centrally recessed portion 36 of the plate 7. The boss 35 and body member 33 are drilled in such relation to the surface of the body member 32 that in the drilling operation the surface of the body member 32 is "cracked" to provide a narrow slot 37. The upper portion of the surface of the body member 32 is then milled or filed to provide a flat surface beneath the stylus of the recorder and the upper surface of the body member 33 is milled to provide a slot 38 in alinement with the slot 37 but of greater width than said slot 37. The slot 38 extends downwardly a sufficient distance to intersect the opening 50, which opening extends throughout the combined length of the body members 32 and 33 and is adapted to slidingly receive the casting 34 upon which the recorder and reproducer are mounted. Because of the difference in width between the slots 38 and 37, shoulders 51 are formed at the intersection of these slots.

The casting 34 comprises a centrally bored cylindrical portion or tube 39, an upstanding portion or block 40, and a guide portion or neck 41 connecting the upstanding portion to the cylindrical portion. The casting 34 is mounted upon the plate 7 by sliding the tube 39 into the opening 50 from the outer edge of the body member 33 and by rotating the casting until the guide portion 41 is in alinement with the slot 38. Thereafter the assembly of these parts is completed by forcing the casting 34 forwardly in the direction of the body member 32. The casting 34 having been inserted into the opening provided in the body members 32 and 33, a substantially semicylindrical plate 44, which has a diameter slightly greater than the diameter of the semicylindrical body member 32, is fastened in any convenient manner, as by screws 43, to the body member 32. This plate 44 is provided with a circular opening in registry with the opening 50 in the body member 32 for permitting the tube 39 of the casting 34 to pass therethrough. A thin annular strip 45 is secured to the surface of the body member 32 adjacent the upstanding portion of the plate 7. This strip 45 forms, with the plate 44 and the surface of the body portion 32 of the anvil 15, a channel for supporting and directing the film in its passage beneath the recorder 13. The strip 45 and the shoulders 51, formed by the intersection of the slots 37 and 38, cooperate with the guide portion 41 of the casting 34 to provide a means for limiting the outward movement of the casting 34 relative to the plate 7. A central bore or aperture 46 extends throughout the greater portion of the tube 39 and connects with a bored and threaded portion or aperture 47 of lesser diameter than the diameter of the bore 46, the threaded aperture 47 extending from the bore 46 to the inner edge of the tube 39. The threaded aperture 47 is adapted to cooperate with the threaded portion of a shaft 49 which is supported in a split bearing 52 which is fastened to the outer vertical face of the body member 33 in any convenient manner, as by screws 164 (Fig. 6). The bearing 52 rotatably engages the shaft 49 between a pair of integrally formed collars 53 and the shaft extends therefrom a sufficient distance to provide a mounting for a sprocket wheel 54. The sprocket 54 is fastened to the extending end of the shaft 59 for rotation therewith by a set screw 55.

Upon rotation of the sprocket 54 and shaft 59 the casting 34 will be moved in and out with respect to the body members 32 and 33, and consequently the recorder 13 and reproducer 14, which are attached to the casting 34, will be moved transversely of the film 20.

Within the bore of the tube 39 a rotatable shaft 100 is inserted and this shaft extends within the tube 39 a distance slightly greater than the width of the body member 32. Near its inner end the shaft 100 is provided with a groove 101, the bottom of the groove 101 forming a curved or cam surface whose diameter is substantially greater than the diameter of the shaft 100. The tubular portion 39 of the casting 34 is provided with a slot 102 in registry with the groove 101 in the shaft 100, the slot 102 being of such shape as to slidingly receive a film supporting member or cam follower 103. The supporting or cam follower member 103, best shown in Fig. 13, is formed by cutting a section from a frustro conical block of the desired size along a pair of parallel vertical planes, to thereby provide a pair of longitudinally tapering circular side edges and a pair of vertical flat surfaces. The member 103 rests within the groove 101 formed in the shaft 100 when that groove is in registry with the opening 102 in the tube 39. With the member 103 in its lowered position, the recorder is rendered inoperative to emboss upon the film the vibrations of the recording stylus. As the shaft 100 is rotated the eccentric or cam formed by the bottom surface of the groove 101 and the surface of the shaft forces the member or cam follower 103 upwardly into the slot 102 and the upper surface 104 of the member 103 maintains the film 20 in contact with the stylus of the recorder. The upper surface 104 of the member 103 is provided with intersecting grooves 105 and 106, the groove 106 being transverse of the film 20 and the groove 105 extending longitudinally of said film. The groove 106 permits the recorder stylus to move laterally of the film to emboss thereon the sound modulations. The longitudinal groove 105, although not absolutely essential, may be somewhat less in depth than the groove 106 and this groove permits the film to sag in the line of the recorder from a point which extends somewhat to each side of the groove 106 so that the possibility that in recording the stylus may cut the film adjacent the edge of the lateral groove 106 will be minimized.

The shaft 100 is provided at its outer extending end with a control handle 107 forming a ready means for manipulating the shaft to raise and lower the member 103 to thereby control the recording operation and to determine the contact pressure between the film and the recording stylus.

The recorder 13, which may be an electromagnetic recorder of conventional structure, is mounted upon the front face of the block 40, as by bolts passing through the block 40 and the supporting base of the recorder. The usual protective housing, which may be slidably supported upon the base of the recorder, encloses the operating parts of said recorder.

The reproducer is mounted upon the casting 34 in the following manner. The block 40 is provided with an offset arm 56, as best shown in Fig. 14, and the front face of this arm carries a boss 57 which is threaded to receive the threaded end of a fixed shaft 58. The arm 30 which supports the head 31 of the sound reproducer 14 is provided at its upper end with a tubular extension 59 extending transversely of the arm. The tubular extension 59 is mounted upon the shaft 58 for slidable movement longitudinally of said shaft. The outer end of the shaft 58 is threaded to engage the internal threaded portion of a cap screw 60 which is adapted to be rotated to adjust the position of the reproducer 14 with respect to the casting 34. Between the rear of the tubular extension 59 and the boss 57, a spring 61 encircles the shaft 58 and yieldably urges the extension 59 into contact with the cap screw 60. By rotating the cap screw 60 the reproducer 14 may be adjusted with respect to the recorder to repeat or "play back" any desired portion of the previously recorded sound.

As best shown in Fig. 2, the drive rollers 17 are loosely mounted on a shaft 61 which extends transversely of the housing and is journaled in bearings 62 formed in the plates 7 and 8. Each roller 17 is provided with a polygonal core 64 which is centrally bored to receive the shaft 61 and is secured against movement longitudinally of the shaft by a set screw 63 which is provided with an enlarged head engaging the outer face of the roller. The cores 64 may be of any desired polygonal shape and cross section, such as will rotatably secure the cores to the rollers, and each core 64 extends only partially of the width of the roller and is provided at its inner edge with a clutch-engaging tooth 65. Clutch members 66 are mounted on the shaft 61 behind the rollers 17 and are located in the dished-out portion 29 of the plates 7 and 8. Each of the clutch members 66 is splined to the shaft 61 for rotation therewith and for slidable movement longitudinally of said shaft to permit the tooth 67 to engage the tooth 65 of the core 64. The shaft 61 is restrained against longitudinal movement by engagement of shoulders formed by the enlarged central portion of the shaft with the bearing members 62. Secured to the shaft 61, between the plates 7 and 8, is a driving pulley 68 which is secured to said shaft for rotation therewith. A pulley 69, which is mounted upon a stub shaft 70, is drivingly connected to the pulley 69 by a cable 71. The stub shaft 70 is journaled in brackets 72 secured in any convenient manner to the housing and to the motor 22. To the end of the shaft of the motor 22 there is secured a gear 73 which meshes with a gear 74 mounted on the shaft 70. The motor 22 is carried in end brackets 75 which are provided with laterally extending flanges 76. The flanges 76 are apertured to slidingly receive a plurality of bolts 77 which pass through the bars 4 and between the flanges 76 and the bars 4 there is interposed a plurality of springs 78 which provide a resilient mounting for the brackets 75 and the motor 22.

Figure 19:
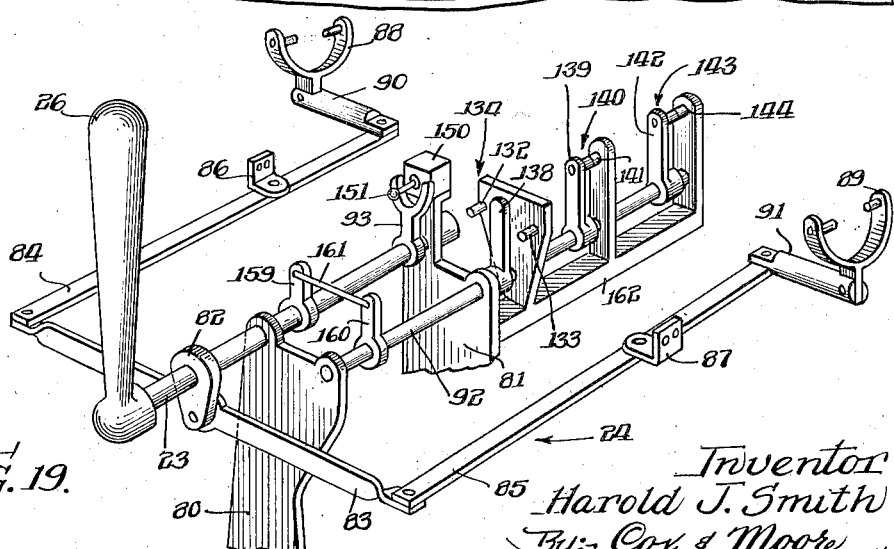
Fig. 19 is a perspective view of a portion of applicant's selective control means.

For selectively controlling the clutch member 66 the mechanism shown in Fig. 19 is provided. This mechanism comprises a shaft 23 which is journaled in a boss 79 formed in the front wall 25 and in brackets 80 and 81, the brackets 80 and 81 being secured to the base 3 of the housing in any suitable and convenient manner. At its outer end the shaft 23 carries the handle 26 which is positioned within the recess in the front wall 25, as previously described. The shaft 23 carries at its end adjacent the inner side of the wall 25 an arm 82 which is pivotally connected to a transversely extending link 83. The link 83 is pivotally connected at its opposite ends to links 84 and 85 which extend parallel to the side walls 1 and 2 and to which they are pivotally connected intermediate their ends by brackets 86 and 87. The opposite ends of the links 84 and 85 are connected to the clutch operating forks 88 and 89 by pivoted links 90 and 91. The shaft 23 is connected to a shaft 92 journaled in brackets 80 and 81 and carries a switch arm 93, between the brackets 80 and 81, for a purpose later to be described. The handle 26 is adapted to assume any one of three positions whereby either or both of the clutch members 66 will engage the teeth 65 to drivingly connect either or both of the drive rollers 17 to the shaft 61.

Each of the drive rollers is provided with a friction face for frictionally driving the film from the inner turn of the reel to the outer turn of the reel. The pressure rollers 18, which maintain the film in frictional engagement with the faces of the drive rollers 17, are each loosely mounted on a shaft 94 which is journaled and supported in a bearing 95 formed on a lever 96. The lever 96 is fixedly secured to a pin 97 which is journaled in the plate 7, the pin 97 being offset relatively to the shaft 94 and extending inwardly of the inner face of the plate 7. Upon the extending end of the pin is secured an arm 98 to the outer end of which a spring 99 is secured, the other end of the spring 99 being secured to the plate 7. From this description it will be seen that the spring 99 exerts, through the arm 98 and lever 96, a certain pressure tending to force the roller 18 and the film 20, which is interposed between the pressure and the driving rollers 17 and 18, in frictional engagement with the face of said drive roller.

The head 31 of the sound reproducer 14 rests against the film 20 at a point along the surface of the drive roller 17.

It is to be noted, that, since the shaft 61 is common to the two drive rollers said drive rollers will rotate in opposite directions as viewed from the outer side of each side wall of the housing. The film 20 therefore passes over the rollers 17 in opposite directions as shown in Figs. 1 and 18. The reproducers 14, Figs. 1 and 18, are consequently on opposite sides of the rollers 17. In order that the reproducer 14, shown in Fig. 18, may pass from its mounting shaft 58 to the opposite side of the roller 17, the arm 30 of that reproducer is provided with a bent extension 108 for that purpose. The pressure roller 18, in Fig. 18, is therefore mounted to the left of roller 17 and the film 20 passes over the pressure roller in a direction opposite from that in which it passes over the roller in Fig. 1. The straps 169, which surround the pressure rollers 18 and serve to guide the film, are oppositely directed in Figs. 1 and 18.

In order to provide the proper longitudinal tension upon the film, the tension rollers 16 are provided. These rollers 16 are mounted upon shafts 110, which are journaled in bearings 111 formed in the plates 7 and 8. Each roller 16 is splined upon its shaft 110 in a manner to permit a slight longitudinal movement of said roller relative to the shaft, but to secure the roller to the shaft for rotation therewith. Between the inner face of each roller and its mounting plate, there is interposed a packing 112 of friction material for the purpose of retarding the rotation of the roller. Each roller is also provided with a friction surface to exert a retarding effort upon the film to thereby tension the same. An adjustment nut 113, threaded upon the outer end of each shaft 110, controls through the interposed washer 114 the longitudinal movement of the roller 16 to thereby provide means for controlling the resisting force offered by the friction material 112.

The rollers 16 are rotated by the film 20 and through the mechanism now to be described control the step-by-step movement of the castings 34 to shift the recorders and reproducers from track to track of the film. This is accomplished by fixedly securing to the inwardly projecting end of each shaft 110 a ratchet 115, which ratchet is adapted to engage a dog 116 pivotally mounted upon an arm 117, the dog 116 being yieldingly urged by a spring 118 into engagement with the teeth of the ratchet. The arm 117 is fastened in any convenient manner to a sprocket wheel 119 which is loosely mounted on the shaft 110 and restrained against longitudinal movement by a set screw 121 which is threaded into the end of the shaft 110. A small sprocket wheel 120 is carried by sprocket wheel 119. For retaining the dog 116 normally out of engagement with the ratchet 115, there is provided a latching mechanism which is released by a notch 122 in the film 20. This mechanism comprises an arm 123 pivoted at 124 to a lug 125 attached to, or formed upon, the plate 7, and the arm 123 carries at its outer end a pin 126 for engaging the under surface of the dog 116 and, in the position shown in Figs. 3 and 4, out of engagement with the teeth of the ratchet 115. A spring 127 is secured at one end to the arm 123 and at its other end to the mounting plate 7 or 8 and this spring provides a retractile force urging the arm 123 in a counterclockwise direction, as seen in Fig. 4, to withdraw the pin 126 from the dog 116. A pin 128 is slidably mounted in an aperture formed in the plate 7 or 8, and contacts the arm 123 at a point above the pivot 124. The outer end of the slidable pin 128 is provided with an enlarged head to engage the side of the film at the periphery of the roller 16. It will be seen from Fig. 4 that the film and each roller 16 are of such relative dimensions that the film projects slightly inwardly of the inner face of the roller 16 to engage the pin 128. The notch 122 is cut into the film at a point such that at the time the notch passes the head of the pin 128 the recording stylus will have completed a track on the film. The notch 122, when in such position, permits the pin 128 and arm 123 to move outwardly under the action of the spring 127 to withdraw the pin 126 from engagement with the dog 116. The spring 118 then rotates the dog relative to the arm 117 and the nose of the dog engages the teeth of the rotating ratchet 115. Upon engagement of the dog 116 with the teeth of the ratchet 115 the sprocket 119 is connected to the ratchet and rotates therewith. A chain 129 passes over the sprocket 119 and the sprocket 54 mounted upon the shaft 49 as shown in Fig. 10 and, as previously described, the rotation of the shaft 49 causes the casting 34 and the attached recorded 13 and reproducer 14 to move transversely of the film 20.

The sprocket 119 is permitted to rotate through one complete revolution, at which time the under surface of the dog 116 is again engaged by the pin 126 to release the dog from the ratchet. Immediately after the operation of the pin 128, the notch 122 will have passed beyond said pin and the unnotched edge of the film will restore the pins 128 and 123 to normal position, wherein the pin 126 is in position to engage the under surface of the dog 116. Therefore, as the arm 123 completes one revolution, the pin 126 will rotate the dog 116, as shown in Fig. 4, to release the dog from the ratchet to thereby limit the rotation of the sprockets 119 and 54.

The sprockets 119 and 54 and the interengaging threads formed on the shaft 59 and the tube 39 are so designed that one complete revolution of the sprocket 119 will move the recorder and reproducer the exact distance between the two adjacent sound tracks. In this connection, it may be noted that each sound track which is embossed by the recorder 13 requires a maximum lateral dimension of approximately .007 of an inch and that applicant has found by providing an automatic change-over of the character described, which change-over accurately determines the distance between tracks, 66 or more parallel sound tracks may be recorded across the face of the film, these parallel tracks being connected by a groove of sound which is recorded during the shifting movement of the recorder from one track to the next. Thus applicant is able to provide a substantially greater number of parallel sound tracks and with no interruption in the recording of sound during the changeover from one track to the next.

The small sprockets 120, which are formed with, or secured to, the sprockets 119, are connected by chains 130 to sprockets 131 of conventional rotation counters or pedometers 27. Since, as previously noted, each sprocket 119 rotates through one revolution upon operation of the associated pin 128, the sprocket 120 likewise rotates through one revolution to advance the indicator 27 one numeral for each operation of its associated change-over mechanism, thereby to provide an accurate indication of the number of the track being recorded.

As shown in the schematic circuit of Fig. 17, the recorders 13 are electrically connected at one end to contacts 132 and 133 of a switch 134. The opposite ends of the recorders 13 are connected to a common lead 135 from a conventional recording amplifier 136. The other lead 137 from the recording amplifier 136 is connected to the contact arm 138 of the switch 134. One of the contacts 132 and 133 is connected to a switch arm 139 of a switch 140 and the other contact is connected to the fixed contact 141 of the same switch 140. The contact 141 is additionally connected to the switch arm 142 of a switch 143, the contact 144 of which is connected to the lead 137 through a resistor 145. The reproducers 14 are connected by a lead 146 to one side of the input of a conventional reproducing amplifier 147 and by a lead 146' to contacts 148 and 149 of a toggle switch 150. A movable arm 151 of the toggle switch 150 is connected by a lead 152 to the other side of the amplifier 147. The output of the reproducing amplifier is connected at one side to one terminal of a loud speaker 153 and at the other side to the center contact 154 of a switch 155. The outer contact 156 of the switch 155 is connected to the other terminal of the loud speaker 153 and the contact 157 is connected to a resistor 158 which is connected to the terminal of the loud speaker opposite that to which the contact 156 is connected. The switch 155 provides means for selectively connecting the output of the reproducing amplifier 147 to the loud speaker 153 or to the resistor 158, which is of equal impedance value to the impedance of the loud speaker. A recording microphone 159 of usual construction is connected to the input of the recording amplifier 136.

As shown in Fig. 19 and schematically indicated in Fig. 17, the handle 26 through shaft 23 operates the switches 134, 140, 143 and 150 to selectively connect one of the reproducers 14 to the reproducing amplifier 147 and to connect either or both of the recorders 13 to the recording amplifier 136. With the handle 26 in a vertical central position, the recorders 13 are connected in parallel through a circuit which passes from the recording amplifier through the resistor 145 to contact 144, switch arm 142 to contact 141, and from contact 141 in parallel through the recorders 13 by means of contacts 132 and 133 to the other lead 135 from the recording amplifier. The switch 150 remains in the position determined by the previous extreme position of the handle 26. That is to say, if the contacts 148 and 151 had been completed with the handle in the previous extreme position, from which it was moved to the central position, those contacts would remain closed to complete the circuit to the reproducer 14 shown at the top of Fig. 17.

If the handle 26 is then moved in a counter-clockwise direction from the center position, contact will be made between switch arm 138 and contact 133 of switch 134. At the same time the switches 140 and 143 will be operated to break the connection between the contacts 139 and 141 and between contacts 142 and 144. The toggle switch 150 will be simultaneously operated to close the contacts 149 and 151. The lower recorder 13 of Fig. 17 will then be connected to the recording amplifier in a circuit which extends from lead 137 through switch arm 138, contact 133, recorder 13 and the lead 135. The circuit to the upper recorder 13 of Fig. 17 will be broken between the contacts 139 and 141. The lower reproducer 14 will be connected to the input of the reproducing amplifier through leads 146 and 152 and switch contacts 149 and 151 of the switch 150.

If the handle is moved in a clockwise direction from the central position, the circuit to the upper recorder 13 and reproducer 14 will be completed by contacts 138, 132, 148 and 151, respectively. With the handle in this position the lower recorder 13 and the reproducer 14 will be disconnected from the recording and reproducing amplifiers.

The elements to the right of the dashed line A—A in Fig. 17 may be conveniently mounted within the side walls 1 and 2 of the housing while the elements to the left of the line A—A of Fig. 17 may be conveniently mounted at any desired remote point or points, the switch 155, and recording amplifier 156 being preferably mounted at a common remote control point. The reproducing amplifier 147 may conveniently be mounted in any desired manner from the side wall supporting bars.

The switches 134, 140, 143 and 150 may be connected to the operating shaft 23 in any convenient manner to accomplish the functions previously described. One form which this connection may take is illustrated in Fig. 19 wherein the shaft 92 for operating the switches 134, 140 and 143 is mounted in brackets 80 and 81 parallel to the shaft 23 and connected to said shaft by the arms 159 and 160 and the link 161. The switch arms 138, 139 and 142 may be mounted in alinement upon the shaft 92, from which they may be insulated in any conventional manner. The insulating supporting plates for the fixed contacts of the switches 134, 140 and 143 may be mounted in any desired manner, as by a bar 162 secured to the brackets 80 and 81. The toggle switch 150 may conveniently be mounted upon the bracket 81 in a position wherein the operating arm 151 is adapted to be operated by the forked lever 93 mounted on the shaft 23.

The operation of the multi-unit sound recorder and sound reproducer herein described is as follows: Assuming that the motor 22 is in operation and that the handle 26 has been moved to its right-hand position, the driving roller 17 of the right-hand unit shown in Fig. 2 will be connected to the shaft 61 and the circuits shown in Fig. 17 will be completed as hereinbefore described to connect the recorder and reproducer of that unit to the recording and reproducing amplifiers. The film 20 is drawn by the friction driving roller 17 from the inner end of the loop of the reel and returned to the outer end and passes intermediately across the surface of the recording anvil 15. The tension roller 16, along which the film passes from the take-off idler roller and from it passes to the recording anvil 15, provides the necessary and adjustable degree of longitudinal tension required for the proper feeding and embossing of the film. The handle 107 having been operated to lift the member 103, the recording stylus vibrates laterally of the film within the groove 106 to emboss the film with a track of sound varying in accordance with the sound variations to which the microphone 159 is subjected. The film 20 in passing downwardly around the driving roller engages the needle of the reproducer 14 to cause the same to vibrate in accordance with the variations previously embossed upon the film by the recorder 13. The complete reel of film having been passed once beneath the recording stylus to complete one track, the notch 122 will reach the pin 128 to permit the change-over mechanism to operate as previously described to shift the recording stylus and support member 103 laterally of the film the desired predetermined distance between sound tracks. During this shifting operation, the recording stylus embosses a portion of sound track between the first track and the second parallel track to which the recorder is moving. The indicator 27 is simultaneously rotated to indicate the number of the track to which the recorder is being moved. The switch 155 provides means for selectively rendering the reproducers 14 effective or ineffective to repeat the sound previously recorded by the recorder.

With the selective switch 155 in one position the reproducing amplifier 147 will be connected to the loud speaker but in its other position the switch 155 will connect the reproducing amplifier to the load resistor 158 and disconnect it from the loud speaker.

By adjustment of the cap screw 60, the reproducer 14 may be shifted relatively to the recorder 13 to repeat from any or, in succession, all of the previously recorded sound tracks.

With the handle 26 moved to its central vertical position, both recorders 13 will be connected to the recording amplifier and that reproducing amplifier which is associated with the previously operating recorder will also be connected to the reproducing amplifier. This simultaneous operation of the recorders makes it possible to shift from one reel, upon which a recording is being completed, to a second reel on which the recording is to be initiated without loss of sound, thereby insuring an accurate and complete record of all proceedings desired to be recorded. This is of especial significance in connection with the reporting of the proceedings before a court of law. The recording of one reel having been completed, the handle 26 is then moved from its central position to the position wherein only the unit associated with the fresh reel will be connected for operation. The completed reel may then be removed from the now inoperative unit and replaced by a new reel at any time during the operation of the other unit.

Thus it will be seen from the above description that applicant has provided a multi-unit, continuous-reel recorder and reproducer of simplified and inexpensive construction possessing numerous advantages.

Changes may be made in the form, construction and arrangement of the parts without departing from the spirit of the invention or sacrificing any of its advantages, and the right is hereby reserved to make all such changes as fairly fall within the scope of the following claims.

What is claimed as new and desired to be secured by Letters Patent is as follows:

1. In a device for recording sound on a moving film, the combination of a movable film supporting member, a movable recorder, and means for moving said recorder and said supporting member transversely of the film whereby said recorder is adapted to form a plurality of parallel sound tracks upon said film.

2. In a device for recording sound on a moving film, the combination of a stationary film supporting base over which said film travels, a recorder having a recording stylus engaging the upper face of the moving film, said recorder being mounted for reciprocation transversely of said film, a film supporting member mounted upon said base for reciprocating movement transversely of said base and film for maintaining said film in engagement with said recording stylus and means for moving said film supporting member and said recorder step-by-step transversely of said film whereby said recorder is adapted to form upon said film a plurality of parallel sound tracks.

3. In the combination of claim 2 wherein means are provided for moving the recording stylus laterally of said film together with means associated with said stylus for embossing on said film undulatory grooves representative of vibrations of sound and wherein the recording stylus is in contact with said film as it is moved laterally so as to form undulatory grooves connecting said parallel sound tracks.

4. In a device for recording sound on a moving film, the combination of a stationary film directing and supporting base, means for feeding said film over said base, a recorder engaging the free face of said film and mounted for movement transversely of said film, a movable film supporting member slidably mounted on said base for movement transversely of said film and engageable therewith opposite the point of engagement of the film with the recorder and means operated by said film for simultaneously moving said recorder and said film supporting member step by step transversely of said film whereby said recorder is adapted to form upon said film a continuous, undulatory sound groove having parallel portions and portions connecting said parallel portions.

5. In a device for recording sound on a moving film, the combination of a stationary film supporting base, a recorder slidably mounted upon said base, means for moving said film between said base and said recorder, a roller member engaging said film, means for rotating said roller for tensioning the film, change-over mechanism for moving said recorder step by step transversely of said film, means operated by the film for connecting said change-over mechanism in drive relation with said roller member and means associated with said last-mentioned means for operating said mechanism upon completion of a sound track by said recorder to thereby form upon said film a plurality of parallel sound tracks.

6. In a device for recording sound on a moving film, the combination of a stationary film supporting base, a recorder slidably mounted upon said base, means for moving said film between said base and said recorder, a roller member engaging said film, means for rotating said roller for tensioning said film change-over mechanism for moving said recorder step by step transversely of said film, means operated by the film for connecting said change-over mechanism in drive relation with said tensioning means, means associated with said last-mentioned means for operating said mechanism upon completion of a sound track by said recorder to thereby form upon said film a plurality of parallel sound tracks, and means connected to said change-over mechanism and operated thereby for providing a numerical indication of the sound track upon which the recorder is operating.

7. In a device for recording sound upon a continuous reel of film, the combination of a film supporting base, a recorder slidably mounted upon said base, a friction drive roller for feeding film from said reel over said supporting base beneath said recorder and back to said reel, a pressure roller for maintaining said film in engagement with said friction roller, a tension roller in advance of said supporting base and having a friction face engaging said film, a support upon which said tension roller is rotatably mounted, friction means interposed between and engaging said support and said tension roller, means for adjusting said tension roller relative to said friction means to retard the rotation of said roller to thereby longitudinally tension the film, and change-over mechanism operated by said tension roller for moving said recorder transversely of said film whereby said recorder is adapted to form upon said film a plurality of parallel sound tracks.

8. In the combination of Claim 4 wherein the recorder comprises a recording stylus in engagement with the free face of the film and wherein the film engaging face of the movable supporting member is provided with a pair of intersecting grooves within which the stylus is adapted to operate to emboss the undulatory grooves upon the film.

9. In a device for recording sound upon a rotatable reel of film, the combination of a fixed support comprising a film supporting portion, said support having a slot extending transversely thereof and a transverse opening therein in communication with said slot, a movable support comprising a laterally extending tubular portion slidably received within said opening, an upstanding mounting portion and a guide portion extending through said slot and connecting said tubular portion and said mounting portion, a cam rotatably mounted within said tubular portion, a cam follower engaging said cam and slidably received within a notch formed in said tubular portion in registry with the slot in the fixed support, said follower having a flat upper face and a groove formed therein, a sound recorder having a depending recorder stylus, means for fixedly securing said recorder to the upstanding mounting portion of said movable support with its recording stylus overlying the film and in alinement with the groove formed in the upper face of the cam follower, means for rotating the cam to raise and lower said follower to cause the film to engage said stylus and means operated by the moving film upon completion of each rotation of the reel for moving the movable support and the recorder transversely of said film to thereby form upon the film a plurality of successive parallel sound tracks.

10. In a sound recorder, a stationary support, a continuous reel of film rotatably mounted on said support, a recorder supported by said stationary support in horizontal alignment with said reel of film for forming upon said film a record representative of sound vibrations, and means for feeding film from the inside of said reel to said recorder and back to the outside of said reel, said recorder and feeding means being resiliently mounted upon said support and within said reel of film, so as to pass film from said reel to said recorder in substantially the plane of said reel.

11. In a device for recording sound on a moving film, the combination of a film supporting base, a recorder slidably mounted upon said base, a reel of film, and driving means within said reel of film for feeding film from said reel over said supporting base.

12. In a device for recording sound upon a continuous reel of film, the combination of a film supporting base, a recorder slidably mounted upon said base, driving means within said reel for feeding film from said reel over said supporting base beneath said recorder and back to said reel, a tension roller in advance of said supporting base and having a friction face engaging said film, a support upon which said tension roller is rotatably mounted, friction means interposed between and engaging said support and said tension roller, means for adjusting said tension roller relative to said friction means to retard the rotation of said roller to thereby longitudinally tension the film, a change-over mechanism operated by said tension roller for moving said recorder transversely of said film whereby said recorder is adapted to form upon said film a plurality of parallel sound tracks.

13. In a device for recording sound on a moving film, the combination of a movable film supporting member, a movable recorder equipped with a recording stylus engaging the face of the moving film, and means for moving said recorder and said supporting member transversely of the film whereby said recorder is adapted to form a plurality of parallel sound tracks upon said film.

14. In a device for recording sound on a moving film, a supporting stationary base, an anvil supported by said base for lateral movement, a film extending over said base, a stylus supported for movement with said anvil as a unit relative to said film, and means for moving said stylus and said anvil relative to said film.

HAROLD J. SMITH.